United States Patent [19]

Lederman

[11] Patent Number: 4,782,928

[45] Date of Patent: Nov. 8, 1988

[54] OVERRUNNING CLUTCH WITH IMPROVED SPRING ATTACHMENT

[75] Inventor: Frederick E. Lederman, Sandusky, Ohio

[73] Assignee: General Motors Corporation, Detroit, Mich.

[21] Appl. No.: 918,575

[22] Filed: Oct. 14, 1986

[51] Int. Cl.$^4$ .............................................. F16D 41/06
[52] U.S. Cl. ......................................... 192/45; 192/44
[58] Field of Search ......................... 192/44, 45, 41 R; 188/82.84, 82.8

[56] References Cited

U.S. PATENT DOCUMENTS

| | | | |
|---|---|---|---|
| 3,055,472 | 9/1962 | Sauzedde | 192/45 |
| 3,732,956 | 5/1973 | Johnson et al. | 192/45 |
| 3,902,580 | 9/1975 | Johnson | 192/45 |
| 4,088,211 | 5/1978 | Doller et al. | 192/45 |
| 4,187,937 | 2/1980 | Kitchin | 192/45 |
| 4,415,072 | 11/1983 | Shoji et al. | 192/45 |
| 4,422,537 | 12/1983 | Ritter et al. | 192/45 |
| 4,549,638 | 10/1985 | Johnson | 192/45 |
| 4,555,002 | 11/1985 | Baker | 192/45 |

FOREIGN PATENT DOCUMENTS

| | | | |
|---|---|---|---|
| 840556 | 7/1960 | United Kingdom | 248/231.8 |

*Primary Examiner*—Rodney H. Bonck
*Assistant Examiner*—Richard M. Lorence
*Attorney, Agent, or Firm*—Patrick M. Griffin

[57] ABSTRACT

An energizing spring for a roller clutch of the type having a cage with horizontal and vertical cross bar pairs is provided with an improved latch. The spring is the accordion type, and the next to last fold thereof is a mounting fold sized to fit over a vertical cross bar. The last spring fold, which includes the spring tail, is open wider than the spacing between the vertical and horizontal cross bars. The spring tail includes a retrorse stop flange and a contralateral biasing finger spaced apart by slightly less than the raidal thickness of the horizontal cross bar, and the biasing finger is formed with a peak. As the mounting fold is pressed into place over the vertical cross bar, the biasing finger flexes past the edge of the horizontal cross bar, and once the peak of the biasing finger has passed the edge of the horizontal cross bar, the spring tends to self-seat. When the biasing finger has flexed back beneath the horizontal cross bar, and the retrorse stop flange has been flattened against the top of the horizontal cross bar, the pushing force on the spring may be released, and the horizontal cross bar will be resiliently captured. The latch so provided has a large zone of stability extending from the peak of the biasing finger to the stop flange.

3 Claims, 1 Drawing Sheet

OVERRUNNING CLUTCH WITH IMPROVED SPRING ATTACHMENT

This application relates to overrunning clutches in general, and specifically to an overrunning roller clutch having an energizing spring attached to a cage of the clutch with an improved latch.

BACKGROUND OF THE INVENTION

Overrunning clutches, especially roller clutches, typically have a cage, which retains a plurality of wedging rollers and which is adapted to be installed within the annular space between coaxial inner and outer clutch races. After the clutch is installed, each roller is resiliently urged in a selected circumferential direction by a respective one of a plurality of roller energizing springs. The energizing springs thus maintain the rollers in a ready position to wedge between the inner and outer races, thereby permitting relative rotation between the races in only one direction. In some clutches, the spring is apparently not directly attached to the cage, and is held in place only by virtue of the fact that is compressed between its respective roller and some structural part of the cage. For example, see U.S. Pat. No. 4,415,072 to Shoji et al, FIG. 8. However, it is often desirable that the spring be directly attached to the cage. This is an advantage during operation of the clutch, as it helps to keep the spring aligned and in the proper operating position, and it also makes the clutch a unitary, easily shipped and handled assembly.

Most roller clutch cage structures, whether formed of metal only, plastic only, or a composite of the two, have axially spaced side rails joined together by cross bars. These cross bars usually have a rectangular cross section with an axially extending length, radially extending width, and circumferentially extending thickness. They may be referred to as vertical cross bars, by virtue of their usual orientation on the drawn page. Vertical cross bars provide convenient anchor points at which to attach the springs. Often, the energizing spring is of the accordion type, meaning that it has a plurality of V or U shaped folds. The outer side of the last fold of the spring may be conveniently referred to as the spring tail. One fold of each spring, which may be the last fold or the next to last fold, is pressed closely over a vertical cross bar, and may be referred to as the mounting fold. This close interfit of the spring mounting fold and vertical cross bar gives the spring a stiff and solid mounting, but is, by itself, generally not sufficient to complete the attachment of the spring to the cage.

To complete the spring attachment, some kind of positive retention of the spring to the cage is desirable. It is possible to achieve that positive retention by permanently wrapping or deforming some portion of the spring mounting fold around the vertical cross bar. However, it is far more convenient from a manufacturing and assembly standpoint to provide the spring with an automatically acting latch, such as a resilient tab that flexes out of the way as the mounting fold is pressed into place, and which then flexes back over an edge of the vertical cross bar. A good example may be seen in U.S. Pat. No. 4,422,537 to Ritter et al. There, the last fold of the spring 6 is the mounting fold, and as it is pressed over the vertical cross bar 9, a resilient tab 13 lanced out of the tail of spring 6 clicks into a slot 14 through vertical cross bar 9, see FIG. 3. With such a retention scheme, however, the strength of the latch is limited by how far the tab can overlie the circumferentially extending edge of the vertical cross bar, that is, it is limited by the thickness of the vertical cross bar. Some cages, however, have a horizontal cross bar adjacent to and spaced from the vertical cross bar. A horizontal cross bar also has an axially extending length, but has a circumferentially extending width and a radially thickness. Other cages do not have a horizontal cross bar per se, but do have a cross bar of L-shaped cross section with a slot cut through it, which effectively creates the equivalent structure. A horizontal cross bar presents much more available circumferentially extending surface area than the adjacent vertical cross bar.

SUMMARY OF THE INVENTION

The invention provides a spring for use in a roller clutch of the type described above that has an improved spring latch that cooperates with a horizontal cross bar so as to give a stronger, more secure positive retention. In the preferred embodiment disclosed, the latch also has a large zone of latch stability, so as to easily compensate for manufacturing tolerances in the structure of the cage. In addition, the improved latch does more than provide a positive retention, as it cooperates in and assists in the process of attaching the spring itself, giving the spring both a self-seating capability and a built in positive stop that allows proper spring attachment to be easily assured and verified.

The preferred embodiment of the invention is disclosed in a roller clutch of the type that has a cage structure with a series of vertical and horizontal cross bar pairs, spaced apart a predetermined amount across a slot comprised of a top edge of the vertical cross bar and the side edge of the respective horizontal cross bar. Each horizontal cross bar also has an outer and an inner circumferentially extending surface. The energizing springs are the accordion type, formed in a series of V-shaped folds with the next to last or mounting fold sized so as to make a close press fit over a vertical cross bar. The last fold of the spring, the outer side of which forms the spring tail, is, in its free state, open wider than the predetermine amount that the adjacent cross bars are spaced apart.

The end of the spring tail of each energizing spring is bent over to give a resilient, retrorse stop flange extending downwardly from and outwardly from the spring tail. Also, a contralateral biasing finger is lanced out of the central portion of the spring tail. The biasing finger, in its free state, extends outwardly from and upwardly from the spring tail toward the stop flange to a peak, and then inwardly and upwardly back toward the spring tail to a free end that is spaced from the stop flange by slightly less than the radial thickness of the horizontal cross bar. The retrorse stop flange and contralateral biasing finger cooperate to give the advantages noted above, as is described next.

To attach the energizing springs to the cage, the mounting fold of each spring is pressed down over a respective vertical cross bar, which is conveniently done by applying a pushing force on the retrorse stop flange. This also concurrently pushes the last fold of the spring into the slot between the respective vertical/horizontal cross bar pair. The free state width of the last spring fold assures that as it enters the slot, the outwardly sloping portion of contralateral biasing finger slides along the side edge of the respective horizontal cross bar, which causes the last spring fold to close up, and which also flexes the biasing finger toward the spring tail. When the peak of the biasing finger passes the side edge of the horizontal cross bar, the potential energy of the closed up last fold and of the flattened biasing finger is released, and the last spring fold begins to return to its free state, tending thereby to draw itself more deeply into the slot, and giving the spring a self-seating characteristic. The pushing force is continued until the retrorse stop flange engages and is flattened out against the outer circumferentially extending surface of the horizontal cross bar. At this point, the contralateral biasing finger can return to substantially its free state, and its free end flexes outwardly of the spring tail and moves beneath the inner circumferentially extending surface of the horizontal cross bar. The engagement of the retrorse stop flange with the horizontal cross bar provides a solid positive stop that may be easily sensed by either an operator or an apparatus, verifying that the end of the pushing stroke has been reached, and that the pushing force may be released.

When the pushing force is released, the retrorse stop flange returns substantially to its free state, and the horizontal cross bar is resiliently captured between the retrorse stop flange and the contralateral biasing finger, both of which remain under some residual retention tension by virtue of the their relative spacing as described above. The spring is then fully latched to the cage, and the strength of the latch is a function of the distance that the retrorse stop flange and the contralateral biasing finger overlie the respective outer and inner surfaces of the horizontal cross bar. The strength of the latch is not limited by the thickness of either cross bar.

In addition, the improved latch of the invention provided by the cooperation of the retrorse stop flange and contralateral biasing finger has a large zone of stability, that is, the zone over which the spring naturally tends to move toward, rather than away from, its secure, fully latched position. That stable zone extends from approximately the point where the peak of the contralateral biasing finger passes the edge of the slot to the flattened position of the retrorse stop flange. This large zone of stability is not limited by the thickness of the horizontal cross bar, and can thus compensate easily for manufacturing variations in the location of the horizontal cross bar. The retrorse stop flange also provides a convenient visual or tactile indicator of assembly completion, by virtue of the fact that it rests above the outer surface of the horizontal cross bar.

It is, therefore, a general object of the invention to provide a roller energizing spring for an overrunning roller clutch that is attached to a roller clutch cage of the type having vertical/horizontal cross bar pairs and which has an improved latch that gives a stronger and more secure positive retention by taking advantage of more of the available surfaces of the horizontal cross bar.

It is another object of the invention to provide such an improved latch that has a large stable zone that can easily compensate for manufacturing tolerances in the cage.

It is yet another object of the invention to provide an energizing spring with such an improved latch in which the latch structure also cooperates in and assists in the process of installing the spring, so as to give the spring both a self-seating capability and a built-in positive stop that allows proper spring attachment to be easily verified.

DESCRIPTION OF THE PREFERRED EMBODIMENT

These and other objects and features of the invention will appear from the following written description and the drawings in which.

Figure 1:
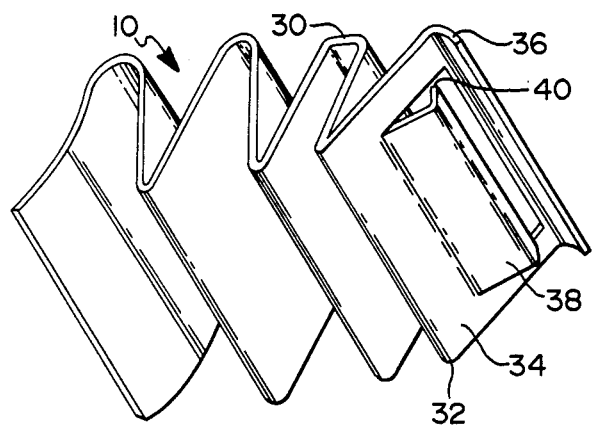
FIG. 1 is a perspective view of an energizing spring incorporating the improved latch of the invention.
Figure 2:
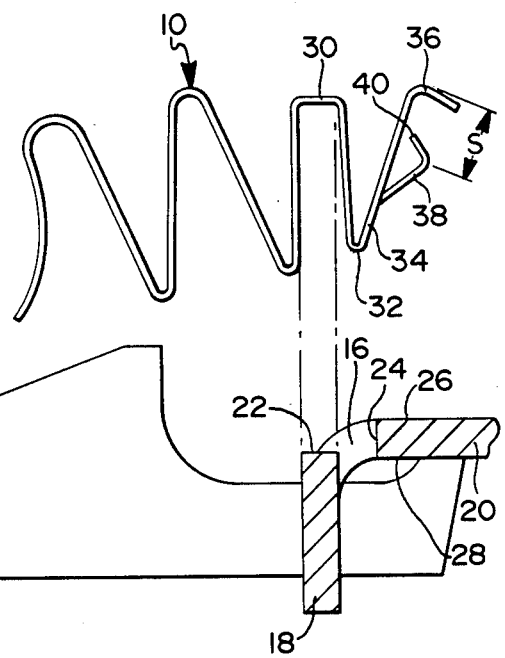
FIG. 2 is a side view of one segment of a roller clutch cage showing one side rail cut away with the energizing spring of FIG. 1 located above the cage before the spring is attached.

Referring first to FIGS. 1 and 2, the preferred embodiment of an energizing spring incorporating the improved latch of the invention is indicated generally at 10. A roller clutch cage, designated generally at 12, retains a plurality of circumferentially spaced rollers, not shown, each energized in conventional fashion by a respective spring 10. Cage 12 is formed of sheet metal, and serves as the foundation to which each spring 10 is attached. Cage 12, as is typical, has at least one side rail 14, and in the embodiment disclosed has two, although one is cut away to reveal other structure. A plurality of evenly circumferentially spaced cross bars extend between the axially spaced side rails 14 to provide structural strength between side rails 14. In a cage design with only one side rail, the L-shaped cross bars could serve to attach journal blocks or other clutch structure. In the particular embodiment disclosed, the cross bars are generally L-shaped in cross section, and have a slot 16 cut therethrough, which will receive part of spring 10, as described below. The net effect of slot 16 is to create, from each L-shaped cross bar, structure that may be referred to as a vertical cross bar, designated generally at 18, and an adjacent horizontal cross bar 20 circumferentially spaced from vertical cross bar 18 by a predetermined amount. Cross bars 18 and 20 are referred to as vertical and horizontal as a matter of convenience, by virtue of their orientation on the drawn page. Whatever their orientation on the drawn page, the pair of cross bars 18 and 20 always have the same, basically orthogonal, relative orientation, although they need not be absolutely perpendicular. While both have an axially extending length, vertical cross bar 18 has a radially extending width and circumferentially extending thickness, while horizontal cross bar 20 has a circumferentially extending width and a radially extending thickness. Another way of conceptualizing the structure is that slot 16 is comprised of the circumferentially extending top edge 22 of the vertical cross bar 18 and the circumferentially spaced, radially extending side edge 24 of the respective horizontal cross bar 20, and has a width equal to the predetermined amount discussed above. However, the structure is conceptualized, cross bar 20 exists fundamentally for cage structural strength. The outer and inner circumferential surfaces 26 and 28 of the horizontal cross bar 20 are used to advantage in the invention to improve the attachment of spring 10 to cage 12, as will be described.

Still referring to FIGS. 1 and 2, each energizing spring 10 is the accordion type, meaning that it is stamped of spring steel into a series of generally V-shaped folds, each of which opens oppositely of and shares a side with the adjacent fold. The next to last or mounting fold 30 is sized so as to make a close frictional press fit over vertical cross bar 18. The last fold 32 of the spring 10 is open wider than slot 16 in its free state. The outer side of the last fold 32 comprises the spring tail 34. It is not absolutely necessary that the spring tail 34 be part of a last fold opening oppositely of and adjacent to a next to last mounting fold 30. Spring tail 34 could be comprised of the outer side of a mounting fold 30 that was itself the last fold, and still include the latch structure of the invention. However, it will be seen below that the configuration disclosed for the last fold 32 is especially advantageous. The upper end of the spring tail 34 is bent over to form a resilient retrorse stop flange 36. By retrorse, it is meant that stop flange 36, in its free state, extends outwardly from and in a downward angular direction from the end of spring tail 34. Stop flange 36 extends outwardly of spring tail 34 farther than the thickness of slot 16 and could extend outwardly even farther, if desired. Still referring to FIGS. 1 and 2, lanced out of the central portion of spring tail 34 is a contralateral biasing finger 38. By contralateral, it is meant that biasing finger 38 acts in conjunction with the opposed stop flange 36 in a manner more fully described below. Biasing finger 38, in its free state, extends initially in the opposite angular direction to stop flange 36, outwardly and upwardly from the spring tail 34 to a peak, and then in the same angular direction as the stop flange 36, inwardly and upwardly back toward the spring tail 34 to a free end 40. Free end 40 is spaced from the outermost edge of the stop flange 36 by slightly less than the thickness of the horizontal cross bar 20. In the particular embodiment disclosed, the free end 40 need not be spaced from spring tail 34 by more than the width of slot 16, for reasons discussed below, and is in fact spaced from spring tail 34 less than the width of slot 16. The peak of finger 38 is spaced farther from spring tail 34, more than the width of slot 16. The retrorse stop flange 36 and contralateral biasing finger 38 cooperate to create an improved latch for spring 10 that is more secure and more stable, as will be described next.

Figure 3:
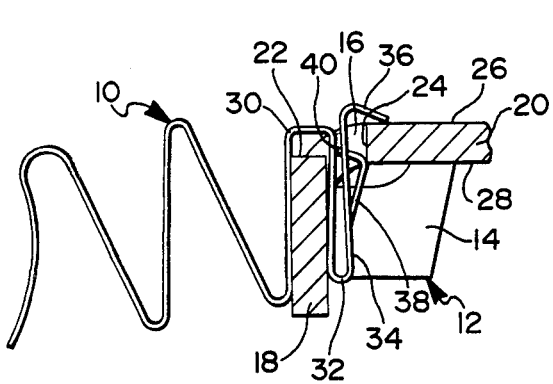
FIG. 3 is a view similar to FIG. 2 showing the spring being pressed over the vertical cross bar at the start of spring attachment.

Referring next to FIG. 3, to attach each spring 10 to cage 12, the mounting fold 30 is pressed down over a respective vertical cross bar 18, which is conveniently done by applying a downward pushing force on the retrorse stop flange 36. Consequently, the last spring fold 32 is forced into the slot 16 and is closed up partially from its free state. As fold 32 closes up, the side edge 24 of the respective horizontal cross bar 20 slides along the outwardly sloping portion of the contralateral biasing finger 38, flexing it toward the spring tail 34. When the peak of the biasing finger 38 slides past the side edge 24 of the horizontal cross bar 20, the closed up last fold 32 opens up partially within slot 16 and the biasing finger 38 begins to return to its free state. The potential energy of the flexed fold 32 and biasing finger 38 are thus both released, which tends naturally to draw the inwardly sloped portion of biasing finger 38 along edge 24, pulling fold 32 more deeply into slot 16, in cooperating with and assisting the pushing force on spring 10. Thus, spring 10 is given a self-seating capability by the biasing finger 38 and last fold 32. Since the peak of the biasing finger is spaced from the spring tail 34 by greater than the predetermined width of slot 16, it is assured that the peak of the biasing finger 38 will click past the horizontal cross bar edge 24, even if fold 32 has so little inherent resilience that spring tail 34 is consequently pushed right up against the shared side of the adjacent mounting fold 30 as spring 10 is attached. However, the more resilient last fold 32 is, the stronger the self-seating action will be.

Figure 4:
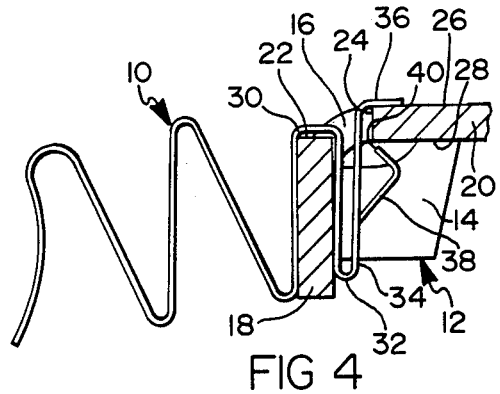
FIG. 4 is a view similar to FIG. 3, but showing the spring at the completion of the pressing stroke.

Referring next to Figure 4, the downward push on spring 10 is continued until the retrorse stop flange 36 engages and is flattened out against the outer horizontal cross bar surface 26. At that point, the contralateral biasing finger 38 can return to substantially its free state, flexing outwardly of the spring tail 34 with its free ed 40 moving beneath the inner horizontal cross bar surface 28. The engagement of the retrorse stop flange 36 with the horizontal cross bar surface 26 provides a positive stop to block the pushing force, and creates an opposing force to the downward pushing force on spring 10. The horizontal cross bar 20 is structurally strong enough so that the opposing force can be allowed to rise sufficiently high to be easily sensed, thereby tripping a limit switch or an equivalent structure to automatically release the pushing force.

Figure 5:
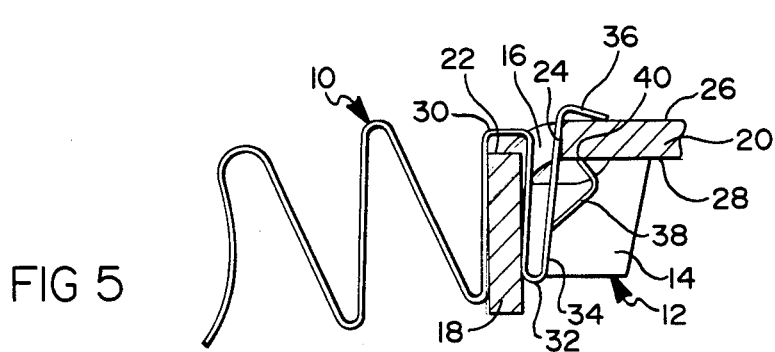
FIG. 5 is a view similar to FIG. 4, but showing the spring in its secure, fully latched position after the pressing force has been removed from the spring.

Referring next to FIG. 5, which shows the fully latched position of spring 10, when the pushing force is released, the retrorse stop flange 36 returns substantially to its free state, flexing back up slightly from its FIG. 4 position. As flange 36 flexes up, it pulls contralateral biasing finger 38 back up slightly, pulling its free end 40 against the inner surface 28 of horizontal cross bar 20 and compressing it. Thus, the horizontal cross bar 20 is resiliently captured between the retrorse stop flange 36 and the contralateral biasing finger 38, both of which remain under some residual tension by virtue of the fact that they are, in their free state, spaced apart slightly less that the radial thickness of the horizontal cross bar 20 measured between surfaces 26 and 28. If the contralateral biasing finger 38 and the retrorse stop flange 36 both extend outwardly from the spring tail 34 by an amount greater than the width of the slot 16, it is assured that the horizontal cross bar 20 will be captured between them. This will hold even if spring fold 32 has almost no free state width, or if it has so little inherent resilience that spring tail 34 is consequently pushed up against, and remains against, the shared side of the mounting fold 30 as the spring 10 is attached. However, in the embodiment disclosed, the fold 32 is relatively wide compared to slot 16 and is highly resilient, so that the spring tail 34 opens up partially within the slot 16 and is biased outwardly against horizontal cross bar edge 24. The wider spring fold 32 is open in its free state compared to the width of slot 16, and the more resilient it is, the stronger is the residual tension of spring tail 34 against edge 24. Since it is assured that the spring tail 34 is tight up against the edge 24, the flange 36 and the finger 38 extend out from the spring tail 34 more than the width of slot 16. The fact that flange 36 and finger 38 extend out significantly at all assures that they will overlie the horizontal cross bar surfaces 26 and 28 respectively and create a secure latch. Therefore, in the preferred embodiment disclosed with the wide and resilient fold 32, three of the possible four surfaces of the horizontal cross bar 20 are used to advantage. The latch strength and security is limited only by how far the retrorse stop flange 36 and contralateral biasing finger 38 can overlie the respective surfaces 26 and 28, which is limited somewhat by the amount of material available in spring tail 34, but which is not limited by the thickness of either cross bar 18 or 20.

Still referring to FIG. 5, the fact that flange 36 and finger 38 are in resilient engagement with the respective various surfaces of horizontal cross bar 20 means not only that the latch is strong and secure, but also assures that the fully latched position is stable. The retrorse stop flange 36 and contralateral biasing finger 38 act in cooperation to provide that stability as follows. Should the spring mounting fold 30 be pushed down from its FIG. 5 position on vertical cross bar 18 by any displacing forces, either before clutch installation or during clutch operation, the stop flange 36 will be flattened slightly against the surface 26, opposing the disturbing force, and will tend naturally to return to its original position, thereby tending to return spring 10 to the FIG. 5 fully latched position. Likewise, should a disturbing force push the spring mounting fold 30 up from its FIG. 5 position on vertical cross bar 18, the biasing finger 38 will be further compressed against the surface 28, opposing the disturbing force, and will tend naturally to return to its original position, acting contralaterally to the stop flange 36 to return spring 10 to the FIG. 5 position.

Thus, the invention provides a latch for spring 10 that has a large zone of stability, that is, the zone over which the spring 10 naturally tends toward, rather than away from, its secure, fully latched position. That stable zone extends from approximately the point where the peak of the contralateral biasing finger 38 passes the edge 24 to the flattened position of the retrorse stop flange 36. This large zone of stability, indicated at S in Figure 1, is significantly larger than, and is not limited by, the radial thickness of the horizontal cross bar 20. Given the large zone of stability, the spring attachment process is less sensitive to tolerances and variations in the structure of cage 12. Thus, either of the horizontal cross bar surfaces 26 and 28 could vary by approximately the amount that the zone of stability S exceeds the radial thickness of the horizontal cross bar 20 without jeopardizing the ability of the spring 10 to reach the fully latched position. This factor alone eases the attachment process, in addition to the self-seating capability provided by the finger 38, and the easily sensed verification of stroke completion provided by the flattening of the flange 36. Furthermore, the flange 36, by virtue of the fact that it rests above the surface 26, provides a convenient visual or tactile indicator of the presence of spring 10. Thus, many advantages flow from structure of cage 12 already present, in cooperation with the structure added to spring tail 34, that is, the retrorse stop flange 36 and contralateral biasing finger 38.

Variations of the preferred embodiment may be made within the spirit of the invention. For example, the last spring fold 32 need not necessarily be open wider than the slot 16 in its free state, if the biasing finger free end 40 and stop flange 36 extend outwardly from spring tail 34 by more than the width of slot 16. And, if fold 32 were absent, the biasing finger 38 and flange 36, could be formed out of the outer side of fold 30, if they extended beyond edge 24. However, the concurrent partial closing up and reopening of the wider last fold 32 as it moves through slot 16 does give the advantage of releasing more potential energy when the peak of biasing finger 38 passes the edge 24. The wider that fold 32 is in its free state or the more resilient it is, or both, the greater that self-seating effect will be, as discussed. Furthermore, it is not absolutely necessary to the latching per se that biasing finger 38 be formed with a peak, as the horizontal cross bar 20 will still be resiliently captured between the biasing finger free end 40 and retrorse stop flange 36 so long as their relative spacing is slightly less than the thickness of horizontal cross bar 20. However, the self-seating effect and large stable zone provided by the disclosed configuration of the contralateral biasing finger 38 are very advantageous. Therefore, it will be understood that the invention is capable of being embodied in structures other than that disclosed, and is not intended to be so limited.

The embodiments of the invention in which an exclusive property or privilege is claimed are defined as follows:

1. In an overrunning roller clutch of the type having a cage with a vertical cross bar and an adjacent horizontal cross bar having circumferentially extending inner and outer surfaces and a radially extending thickness with an edge circumferentially spaced from said vertical cross bar by a predetermined amount, and an accordion type roller energizing spring having a mounting fold adapted to be press fitted over said vertical cross bar as said spring is attached to said cage an also having a spring tail, an improved latch for positively retaining said spring to said cage, said improved latch comprising, a resilient retrorse stop flange extending, in its free state, outwardly and downwardly from said spring tail and, a contralateral biasing finger extending, in its free state, outwardly and upwardly from said spring tail toward said stop flange to a free end spaced from said retrorse stop flange by less than the radial thickness of said horizontal cross bar, whereby, as a pushing force is applied to said spring to press said spring mounting fold over said vertical cross bar, said biasing finger slides along and is flexed toward said spring tail by said horizontal cross bar edge until said retrorse stop flange is flattened against said horizontal cross bar outer surface and said biasing finger free end passes said horizontal cross bar edge and returns substantially to its free state, at which point said pushing force is released and said retrorse stop flange returns to substantially its free state, thereby resiliently grasping said outer and inner horizontal cross bar surfaces between said retrorse stop flange and the free end of said contralateral biasing finger respectively so as to securely latch said spring to said cage.

2. In an overrunning roller clutch of the type having a cage with a vertical cross bar and an adjacent horizontal cross bar having circumferentially extending inner and outer surfaces and a radially extending thickness with an edge circumferentially spaced from said vertical cross bar by a predetermined amount, and an accordion type roller energizing spring having a mounting fold adapted to be press fitted over said vertical cross bar as said spring is attached to said cage and also including a spring tail, an improved latch for positively retaining said spring to said cage that has a large stable zone that can compensate for manufacturing tolerances in said cage, said improved latch comprising, a resilient retrorse stop flange extending, in its free state outwardly and downwardly from said spring tail, and, a contralateral biasing finger extending, in its free state outwardly and upwardly from said spring tail toward said stop flange to a peak, and then inwardly and upwardly toward said spring tail to a free end spaced from said retrorse stop flange by less than the thickness of said horizontal cross bar, whereby, as a pushing force is applied to said spring to press said spring mounting fold over said vertical cross bar, said biasing finger slides along and is flexed toward said spring tail by said horizontal cross bar edge until the peak of said contralateral biasing finger passes said horizontal cross bar edge, at which point said contralateral biasing finger begins to return to its free state, thereby drawing the inwardly and upwardly sloping portion of said biasing finger along said horizontal cross bar edge to assist said pushing force, with said retrorse stop flange being eventually flattened against said horizontal cross bar outer surface to signal that said pushing force should be released, after which said retrorse stop flange returns to substantially its free state, thereby resiliently capturing said horizontal cross bar outer and inner surfaces between said retrorse stop flange and the free end of said contralateral biasing finger respectively so as to securely latch said spring to said cage, said improved latch having a stable zone extending substantially from the peak of said contralateral biasing finger to said retrorse stop flange.

3. In an overrunning roller clutch of the type having a cage with a vertical cross bar and an adjacent horizontal cross bar having circumferentially extending inner and outer surfaces and a radially extending thickness with an edge circumferentially spaced from said vertical cross bar by a predetermined amount, and an accordion type roller energizing spring having a mounting fold adapted to be press fitted over said vertical cross bar as said spring is attached to said cage and an adjacent last fold which has a significant resilience and which, in its free state, is open wider than said predetermined amount and which includes a spring tail, an improved latch for positively retaining said spring to said cage that has a large stable zone that can compensate for manufacturing tolerances in said cage, said improved latch comprising, a resilient retrorse stop flange extending, in its free state, outwardly and downwardly from the end of said spring tail and, a contralateral biasing finger extending, in its free state outwardly and upwardly from said spring tail toward said stop flange to a peak and then inwardly and upwardly back toward said spring tail to a free end spaced from said retrorse stop flange by less than the thickness of said horizontal cross bar, whereby, as a pushing force is applied to said spring to press said spring mounting fold over said vertical cross bar, said biasing finger slides along and is flexed toward said spring tail by said horizontal cross bar edge as said last spring fold is closed up in said slot, until the peak of said contralateral biasing finger passes said horizontal cross bar edge, at which point said contralateral biasing finger begins to return to its free state and said resilient last fold begins to open up within said slot, thereby drawing the inwardly sloping portion of said biasing finger along said horizontal cross bar edge to assist said pushing force, with said retrorse stop flange being eventually flattened against said horizontal cross bar outer surface to signal that said pushing force should be released, after which said retrorse stop flange returns to substantially its free state, thereby resiliently capturing said horizontal cross bar outer and inner surfaces between said retrorse stop flange and the free end of said contralateral biasing finger respectively with said spring tail resiliently biased against said horizontal cross bar edge so as to securely latch said spring to said cage, said improved latch having a stable zone extending substantially from the peak of said contralateral biasing finger to said retrorse stop flange.

* * * * *